(No Model.)

J. W. PIKE.
BOX FOR HOLDING CLOTHES PINS.

No. 516,279. Patented Mar. 13, 1894.

Witnesses
R. N. C. Riker
S. K. Mathewson

Inventor
James W. Pike

UNITED STATES PATENT OFFICE.

JAMES W. PIKE, OF WICHITA, KANSAS.

BOX FOR HOLDING CLOTHES-PINS.

SPECIFICATION forming part of Letters Patent No. 516,279, dated March 13, 1894.

Application filed May 15, 1893. Serial No. 474,375. (No model.)

*To all whom it may concern:*

Be it known that I, JAMES W. PIKE, a citizen of the United States, and a resident of Wichita, Sedgwick county, State of Kansas, have invented a new and useful receptacle or box for the purpose of holding clothes-pins or any other articles it may be adapted for, of which the following is a specification.

Figure 1:
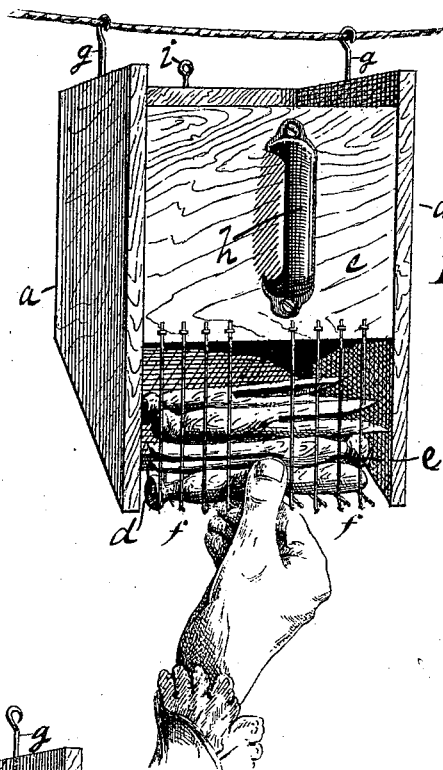
Figure 2:
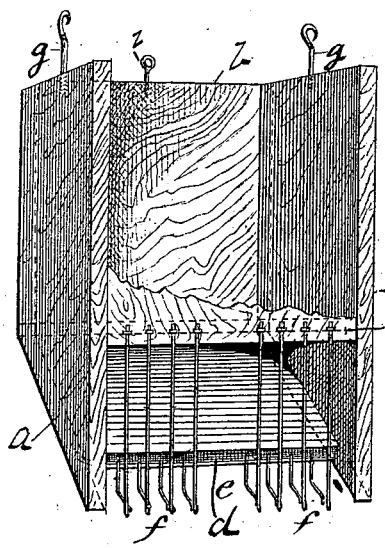
Figure 4:
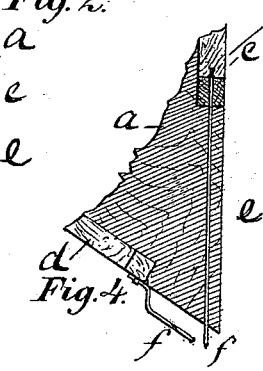
Figure 3:
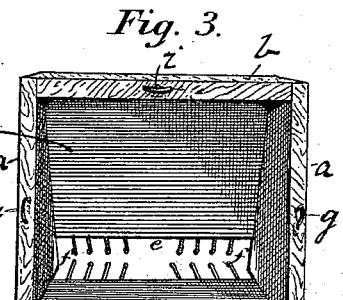

In the accompanying drawings—Figure 1, is a perspective view of the clothes-pin box on the line. Fig. 2, is a perspective view of the box part being broken away. Fig. 3, is a view of the interior of the box. Fig. 4, is a sectional view of the lower front portion of the box, showing the arrangement of the wire springs for holding the clothes-pins within the box.

My improved clothes-pin box is constructed as follows:—Two sides, $a$, are provided, the lower ends of which are inclined as shown; and these two sides are connected by a back piece, $b$, and front piece, $c$, and an inclined bottom, $d$, the top of the box being left open. The front piece, $c$, and bottom, $d$, do not extend to the lower corner of the box thereby leaving the opening, $e$. Wire springs, $f$, are fastened to the front and bottom of the box closing the opening, $e$, sufficiently to prevent the clothes-pins from dropping out by reason of their weight. The hooks, $g$, are screwed in the sides of the box, so that the box will hang on the line and can be slid along the line and easily be put on or taken off the line. The handle, $h$, on the front of the box is for the purpose of carrying the box. The eye, $i$, is fastened in the top of the back of the box, and is for the purpose of hanging the box up when not in use on the line. The pins in the box are easily removed by pulling them out in front, the bottom being inclined causing other pins to roll in the place of the ones pulled out.

What I claim, and desire to secure by Letters Patent of the United States, is—

1. A clothes-pin receptacle provided with suitable supporting hooks adapted to take over a line, and an inclined bottom, the end of said receptacle adjacent to the line being open, and the receptacle being provided with a spring closed opening at the lowest end of the inclined bottom, substantially as described.

2. In a clothes-pin receptacle having an open end, hook supports $g$, adjacent to said open end, adapted to take over a supporting line, an inclined bottom $d$, opening $e$, in the front wall, and bottom $d$, of said receptacle, springs $f$, for closing said opening, handle $h$, and supporting eye, $i$, all combined and arranged as described, and for the purposes set forth.

JAMES W. PIKE.

Witnesses:
 D. N. MATHEWSON,
 R. N. C. RIKER.